(12) United States Patent
Jaiswal et al.

(10) Patent No.: US 8,494,122 B2
(45) Date of Patent: **\*Jul. 23, 2013**

(54) INTERACTIVE VOICE RESPONSE (IVR) SYSTEM CALL INTERRUPTION HANDLING

(75) Inventors: Peeyush Jaiswal, Research Triangle Park, NC (US); James R. Lewis, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,720

(22) Filed: Feb. 28, 2012

(65) Prior Publication Data

US 2012/0213341 A1    Aug. 23, 2012

Related U.S. Application Data

(62) Division of application No. 12/436,943, filed on May 7, 2009, now Pat. No. 8,374,317.

(51) Int. Cl.
*H04M 1/64* (2006.01)
*H04W 24/00* (2009.01)
*G06F 3/14* (2006.01)

(52) U.S. Cl.
USPC .......... 379/88.04; 345/440; 370/351; 379/76; 379/88.23; 379/266.08; 379/309; 379/393; 455/408; 455/423; 455/450; 455/452.1; 711/170; 718/102; 725/38

(58) Field of Classification Search
USPC ............ 345/440; 370/351; 379/68, 76, 88.01, 379/88.04, 88.23, 215.01, 265.02, 266.08, 379/309, 393, 51, 74; 455/408, 423, 450, 455/452.1; 718/102; 725/38; 711/170
See application file for complete search history.

(56) References Cited

U.S. PATENT DOCUMENTS

| | | | | |
|---|---|---|---|---|
| 3,549,810 A * | 12/1970 | Waddell et al. | ................ | 379/51 |
| 6,720,967 B1 * | 4/2004 | Cox et al. | ...................... | 345/440 |
| 6,766,173 B1 * | 7/2004 | Chun et al. | .................... | 455/450 |
| 6,801,520 B2 * | 10/2004 | Philonenko | ................... | 370/351 |
| 6,889,048 B1 * | 5/2005 | Koo | ........................... | 455/452.1 |
| 6,952,825 B1 * | 10/2005 | Cockx et al. | .................. | 718/102 |
| 7,007,150 B2 * | 2/2006 | Valentin et al. | ............... | 711/170 |
| 7,024,174 B2 * | 4/2006 | Nagy et al. | .................... | 455/408 |
| 7,272,399 B2 * | 9/2007 | Han | ....................... | 455/450 |
| 7,471,774 B2 * | 12/2008 | Patel et al. | ....................... | 379/76 |
| 7,483,527 B2 * | 1/2009 | Kunkel | ..................... | 379/265.02 |
| 7,813,480 B2 * | 10/2010 | Takahashi | ....................... | 379/68 |
| 7,817,786 B2 * | 10/2010 | Lee et al. | ................... | 379/88.23 |
| 8,155,276 B2 * | 4/2012 | Beauregard et al. | ............. | 379/74 |
| 8,374,317 B2 * | 2/2013 | Jaiswal et al. | ............. | 379/88.04 |
| 2002/0141559 A1 * | 10/2002 | Gurgun | ..................... | 379/215.01 |
| 2005/0074114 A1 * | 4/2005 | Fotta et al. | ............... | 379/266.08 |
| 2007/0142054 A1 * | 6/2007 | Sanjeev et al. | ................. | 455/450 |

(Continued)

Primary Examiner — Gerald Gauthier
(74) Attorney, Agent, or Firm — Steven Greenberg, Esq.; Carey, Rodriguez, Greenberg & O'Keefe

(57) ABSTRACT

Embodiments of the present invention address deficiencies of the art in respect to interactive voice response (IVR) system session management and provide a method, system and computer program product for call interruption handling in an IVR data processing system. In an embodiment of the invention, a method for call interruption handling in an IVR data processing system can include detecting a call interruption of a telephone call between a caller and an IVR system during an established IVR session for the caller. The method also can include saving state information for the established IVR session in connection with the caller in response to detecting the call interruption.

5 Claims, 1 Drawing Sheet

U.S. PATENT DOCUMENTS

| | | | |
|---|---|---|---|
| 2008/0077956 A1* | 3/2008 | Morrison et al. | 725/38 |
| 2008/0084989 A1* | 4/2008 | Dhanakshirur | 379/309 |
| 2009/0161859 A1* | 6/2009 | Erhart et al. | 379/393 |
| 2010/0120414 A1* | 5/2010 | Bellovin | 455/423 |
| 2010/0284522 A1* | 11/2010 | Jaiswal et al. | 379/88.04 |
| 2012/0213341 A1* | 8/2012 | Jaiswal et al. | 379/88.01 |

\* cited by examiner

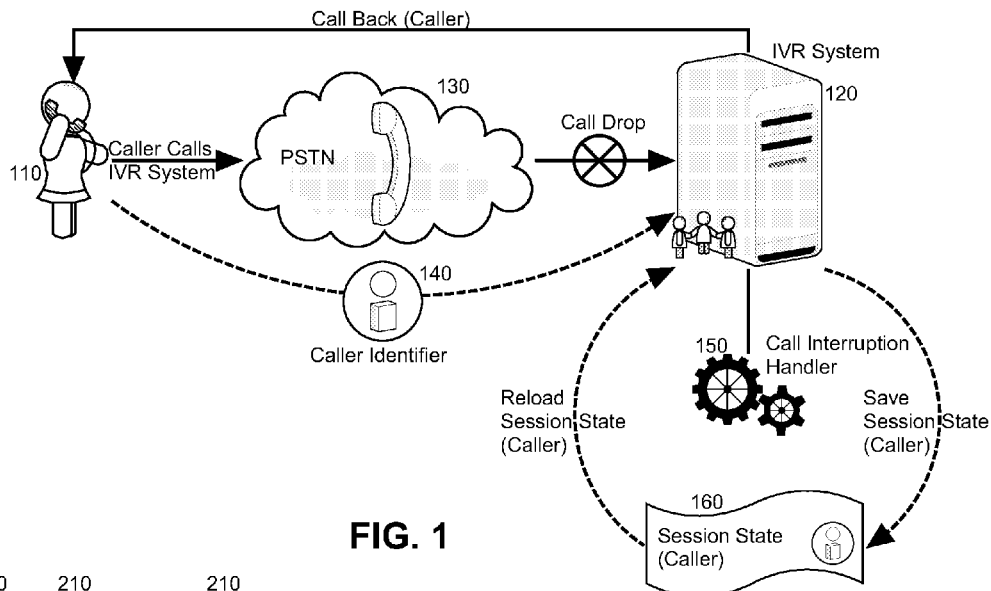
FIG. 1
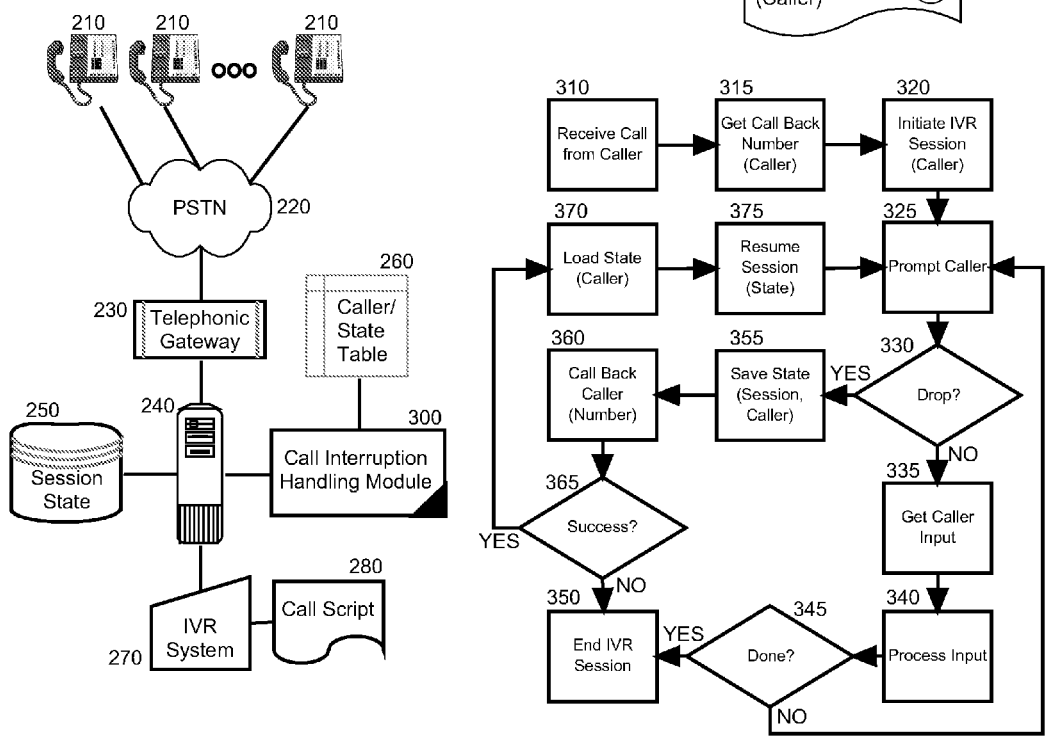
FIG. 2
FIG. 3

INTERACTIVE VOICE RESPONSE (IVR) SYSTEM CALL INTERRUPTION HANDLING

CROSS-REFERENCE TO RELATED APPLICATIONS

This application is a Divisional of U.S. application Ser. No. 12/436,943, filed May 7, 2009, currently pending, the entirety of which is incorporated herein by reference.

BACKGROUND OF THE INVENTION

1. Field of the Invention

The present invention relates to the field of IVR system call processing and more particularly to call interruption handling in an IVR system.

2. Description of the Related Art

IVR systems have revolutionized industrial call processing and find wide application across multiple industries—particularly with respect to industrial customer service. An IVR system is an automated call processing system providing self-service interactions with callers through a telephone call. The most basic IVR system provides a sequence of prompts that vary according to caller selections—generally provided in the form of dial tones or spoken choices. More advanced IVR systems handle natural language input from callers in order to properly service caller requests. Even more advanced IVR systems provide an escalation path in which callers ultimately can be routed to a human operator when requested by the caller, or when detected as necessary, but otherwise provide automated responses in the absence of human intervention.

IVR systems usually include a computing system with a call processing gateway between the computing logic of the IVR system and the public switched telephone network (PSTN). In this regard, the call processing gateway generally includes hardware configured for coupling to the PSTN and also to a data communications pathway, either through direct bus connection of the computing system, or a packet switched network connection to a remote server. Some IVR systems include pre-recorded audible responses triggered for playback in response to user input while other IVR systems process scripts such as Voice Extensible Markup Language (VXML) compliant scripts and dynamically generate audible responses—typically by way of a text-to-speech (TTS) engine or through a combination of TTS and pre-recorded audio. Even more advanced IVR systems process spoken user input by way of a speech recognition engine in order to properly select a response to a user inquiry.

The ability of an IVR to system to successfully process a caller request largely depends upon the maintenance of a telephonic connection between the caller and the IVR system. Under conventional circumstances, so long as the telephonic link between caller and IVR system is maintained, the ability of the IVR system to service a caller request depends only upon the robust nature of the responses able to be provided in response to user input as defined by the call flow of the IVR system. However, when a telephone call between caller and IVR system drops or otherwise becomes interrupted, the IVR system cannot provide the requisite responses to caller input, obviously. Ordinarily, in such a circumstance, the IVR system upon detecting a drop of the telephonic connection merely terminates the call response session and the caller must re-engage the IVR system from the beginning over a new telephonic connection.

In an age of cellular and Internet protocol (IP) telephony and geographically remote customer service call centers, calling an IVR system over a less then perfectly reliable telephonic connection is common. Accordingly, dropped phone calls during an IVR system session increasingly have become commonplace. Even still, the experience of a dropped telephone call during an IVR system session can be frustrating to the caller who must begin anew the interactions with the IVR system and can defeat the intent of the IVR system in easing customer service for callers.

BRIEF SUMMARY OF THE INVENTION

Embodiments of the present invention address deficiencies of the art in respect to IVR system session management and provide a novel and non-obvious method, system and computer program product for call interruption handling in an IVR data processing system. In an embodiment of the invention, a method for call interruption handling in an IVR data processing system can include detecting a call interruption of a telephone call between a caller and an IVR system during an established IVR session for the caller. The method also can include saving state information for the established IVR session in connection with the caller in response to detecting the call interruption. The method further can include determining a call back number for the caller and initiating a call back of the caller from the IVR system using the call back number of the caller thereby re-establishing an IVR session for the caller. Finally, the method can include restoring the saved state information for the re-established IVR session for the caller.

In another embodiment of the invention, an IVR data processing system can be configured for call interruption handling. The system can include an IVR system configured for coupling to a plurality of telephone endpoints over a PSTN. The system also can include a call interruption handling module coupled to the IVR system. The module can include program code enabled to detect a call interruption between a caller and the IVR system during an established IVR session with the caller, to save state information for the established IVR session in connection with the caller in response to detecting the call interruption, to determine a call back number for the caller, to initiate a call back of the caller from the IVR system using the call back number of the caller and to re-establish an IVR session for the caller, and to restore the saved state information for the re-established IVR session for the caller.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for call interruption handling in an IVR data processing system;

FIG. 2 is a schematic illustration of an IVR data processing system configured for call interruption handling; and, FIG. 3 is a flow chart illustrating a process for call interruption handling in an IVR data processing system.

DETAILED DESCRIPTION OF THE INVENTION

Embodiments of the present invention provide a method, system and computer program product for call interruption handling in an IVR data processing system. In accordance with an embodiment of the present invention, an IVR session can be established between a caller and an IVR data processing system. At the outset, the caller can be identified and a call back number determined, for example as previously stored in a record for the caller, by way of caller identification, or by express caller designation of a call back number during the IVR session. Thereafter, caller interaction can be processed within the IVR session until call interruption is detected— namely a call drop. In the event of call interruption, the state of the IVR session can be stored and the IVR system can initiate a call back to the caller at the call back number. Upon re-establishing a telephone call with the caller at the call back number, the saved state can be restored and the IVR session can resume according to the saved state. In this way, a tedious return to the start of the IVR session due to the call interruption can be avoided.

In illustration, FIG. 1 pictorially depicts a process for call interruption handling in an IVR data processing system. As shown in FIG. 1, a caller 110 can establish a telephone call with an IVR system 120 over the PSTN 130. Initially, a caller identifier 140 can be determined for the caller 110, such as a name, unique identifier, or call back number. A call interruption handler 150 for the IVR system 120 can detect a call interruption between the caller 110 and the IVR system 120, for example by way of a time out or the physical detection of a dropped call. In response to detecting a call interruption, the call interruption handler 150 can save the session state 160 of the IVR session between the caller 110 and the IVR system 120. Thereafter, the IVR system 120 can call back the caller 110 at a call back number associated with the caller identifier 140 and the session state 160 can be reloaded so as to permit a resumption of the IVR session at a point proximate to a point whence the call interruption had been detected.

The process described in connection with FIG. 1 can be implemented in an IVR data processing system. In further illustration, FIG. 2 schematically shows an IVR data processing system configured for call interruption handling. The system can include a host computer 240 (or multiple host computers) communicatively coupled to different telephonic endpoints 210, for instance physical telephones, cellular telephones, or soft phones, over a PSTN 220 by way of a telephonic gateway 230. The host computer 240 can support the execution of an IVR system 270 in memory by a processor or processors of the host computer 240. The execution of the IVR system 270 can include conducting a request/response session with different callers at the different telephonic endpoints 210 utilizing a call flow defined within a call script 280, such as a VXML defined call script.

Of note, a call interruption handling module 300 can be coupled to the host computer 240. The call interruption handling module 300 can include program code enabled to detect a call interruption between a caller at an associated one of the telephonic endpoints 210 and the IVR system 270. The program code further can be enabled to persist the session state of the IVR session between the caller and the IVR system 270 in a data store of session state 250 in response to detecting the call interruption. Yet further, the program code can be enabled to call back the caller at a call back number stored in association with the caller in a caller/state table 260 in response to detecting the call interruption. Finally, the program code can be enabled to retrieve the stored session state for the caller upon re-establishing a telephonic connection with the caller at the call back number and to restore the retrieved session state to resume the IVR session between the caller at the associated telephone endpoint 210 and the IVR system 270.

In yet further illustration of the operation of the call interruption handling module 300, FIG. 3 is a flow chart illustrating a process for call interruption handling in an IVR data processing system. Beginning in block 310, a call can be received from a caller in the IVR data processing system. In block 315, a call back number can be determined for the caller. For instance, the caller can be prompted to provide a call back number, or an identifier with which a pre-stored record of a call back number can be retrieved, or a caller identification record can be retrieved from the call itself. Thereafter, in block 320, an IVR session can be established with the caller.

As such, in block 325 the caller can be prompted according to the call flow defined for the IVR session (such as that defined by way of a VXML compliant document). In decision block 330, it can be determined whether or not the call has been interrupted. If the call has not been interrupted, in block 335, caller input can be received in response to the IVR provided prompt and in block 340 the user input can be processed in accordance with the call flow of the IVR session. In decision block 345, if the IVR session has completed, in block 350 the IVR session can end. Otherwise, in block 325 the caller can be prompted once more in accordance with the call flow of the IVR session.

Of note, in decision block 330, if it is determined that the call with the caller has been interrupted, in block 355 the state of the IVR session with the caller can be saved and the call back number for the caller retrieved. In block 360, a call back can be initiated to the caller using the call back number. In decision block 365, it can be determined whether or not the attempt to call back the caller has been successful and that a new telephone call has been established between the IVR system and the caller for a newly established IVR session. If not, the IVR session can end for the caller in block 350 (or alternatively, a discrete number of attempts to re-establish a telephonic connection with the caller can be attempted).

Notwithstanding, in decision block 365, if it is determined that a telephone call has been re-established with the caller, in block 370, the saved state information for the IVR session with the caller can be retrieved and applied to the newly established IVR session for the caller. Subsequently, in block 375 the newly established IVR session can resume at a point in the call flow of the IVR session consistent with the state information. As such, in block 325 again the caller can be prompted by the IVR system in accordance with the call flow of the IVR session and the process can continue normally through decision block 330 without having required the caller to start at the beginning of the call flow for the IVR session in consequence of the call interruption.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for call interruption handling in an interactive voice response (IVR) data processing system, the method comprising:

detecting a call interruption of a telephone call between a caller and an IVR system during an established IVR session for the caller;

saving state information for the established IVR session in connection with the caller in response to detecting the call interruption;

determining a call back number for the caller;

initiating a call back of the caller from the IVR system using the call back number of the caller and re-establishing an IVR session for the caller by attempting a discrete number of telephone calls to the caller at the call back number, closing the IVR session for the caller if the discrete number of telephone calls fail to result in an re-establishment of the IVR session for the caller, but otherwise re-establishing the IVR session for the caller for a successful one of the discrete number of telephone calls; and, restoring the saved state information for the re-established IVR session for the caller.

2. The method of claim 1, wherein detecting a call interruption of a telephone call between a caller and an IVR system during an established IVR session for the caller, comprises detecting a dropped telephone call between a caller and an IVR system during an established IVR session for the caller.

3. The method of claim 1, wherein determining a call back number for the caller comprises retrieving caller identification information for the caller.

4. The method of claim 1, wherein determining a call back number for the caller comprises prompting the caller through the established IVR session for a call back number.

5. The method of claim 1, wherein initiating a call back of the caller from the IVR system using the call back number of the caller and re-establishing an IVR session for the caller, comprises:

attempting a discrete number of telephone calls to the caller at the call back number;

closing the IVR session for the caller if the discrete number of telephone calls fail to result in an re-establishment of the IVR session for the caller; and, otherwise re-establishing the IVR session for the caller for a successful one of the discrete number of telephone calls.

* * * * *